Dec. 17, 1940.   W. D. OSBORN   2,225,128
ROD COUPLING
Filed Jan. 9, 1939
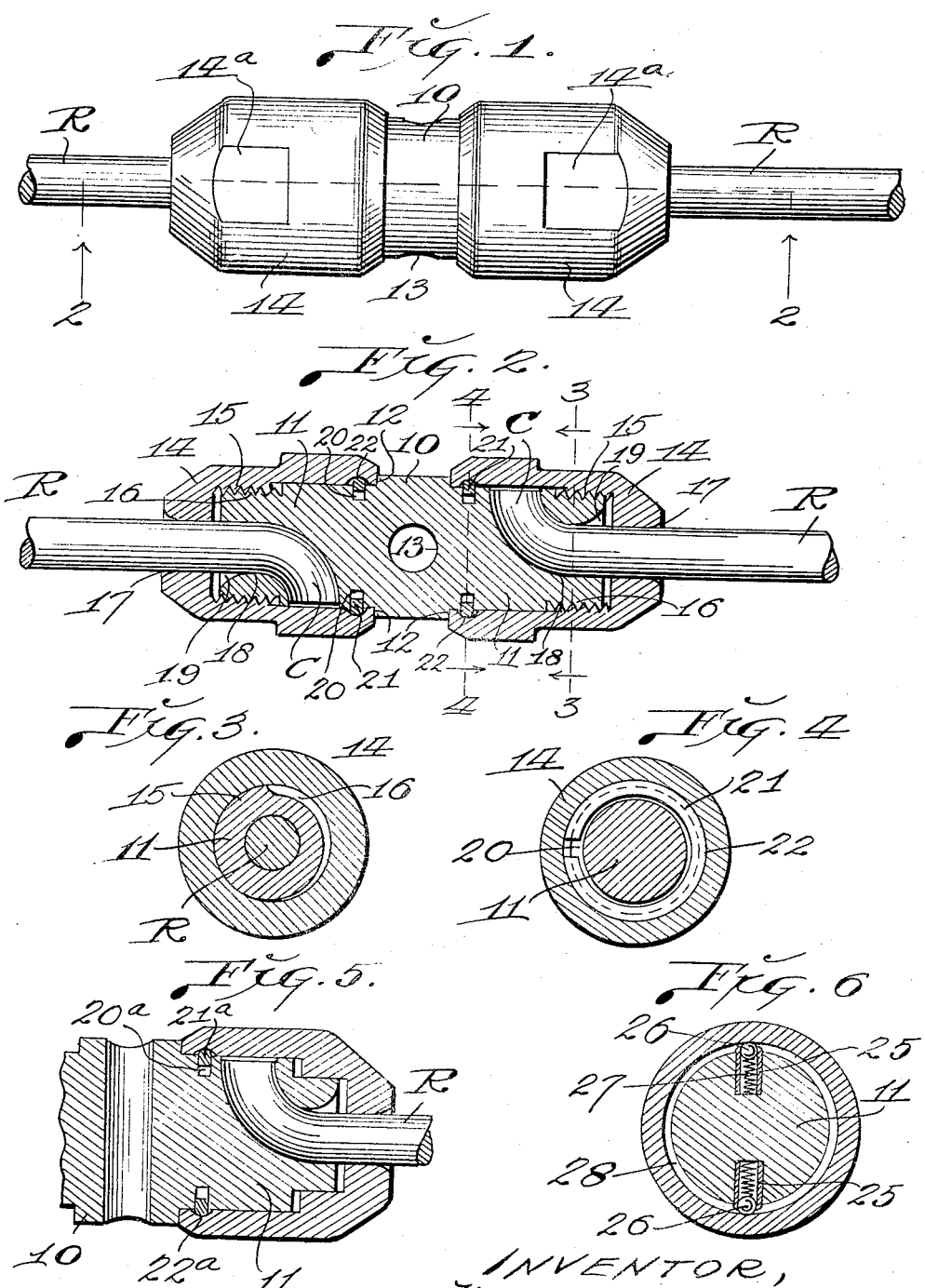
INVENTOR,
WILLIAM D OSBORN
BY Martin R Smith ATTY Patented Dec. 17, 1940

2,225,128

UNITED STATES PATENT OFFICE 2,225,128

ROD COUPLING

William D. Osborn, Los Angeles, Calif.

Application January 9, 1939, Serial No. 249,873

5 Claims. (Cl. 287—105)

My invention relates to a rod coupling and has for its principal object, the provision of a relatively simple, practical and inexpensive coupling, for rods and particularly the flexible rods forming a part of apparatus utilized for removing accumulations from and cleansing sewer and drain pipes or any duct where accumulations develop to such an extent as to interfere with the flow of liquid through the pipes or ducts.

The principal objects of my invention are, to provide a rod coupling device that may be easily and quickly manipulated in making a firm and substantial connecton between the ends of rods and likewise readily manipulated in disconnecting the rod sections, further, to provide a coupling wherein the connected ends of the rods are protected against contact with the inner surfaces of the pipes or ducts in which the rods are inserted and further, to provide a coupling with internally arranged latching means between certain of its parts so as to prevent said parts from becoming accidentally disconnected as a result of frictional contact with the inner surfaces of the pipes and conduits while the connected rods are being rotated during pipe cleaning operations.

A further object of my invention is, to provide a form of rod coupling that is constructed so that it may be applied to the adjacent ends of rods without the necessity for screwing the parts together and likewise disconnected without unscrewing operations.

With the foregoing and other objects in view, my invention consists in certain novel features of construction and arrangement of parts that will be hereinafter more fully described and claimed and illustrated in the accompanying drawing in which:

Fig. 1 is a side elevational view of a rod coupling constructed in accordance with my invention.

Fig. 2 is a longitudinal section taken on the line 2—2 of Fig. 1.

Fig. 3 is a cross section taken on the line 3—3 of Fig. 2.

Fig. 4 is a cross section taken on the line 4—4 of Fig. 2.

Fig. 5 is a fragmentary longitudinal section taken through the center of a modified form of the coupling.

Fig. 6 is a cross sectional view showing a modified construction that includes internal latching means for the separable parts of the coupling.

Referring by numerals to the accompanying drawing and particularly to the construction illustrated in Figs. 1 to 4 inclusive, 10 designates a short cylindrical body and, projecting from the ends thereof are substantially cylindrical end portions 11 that are slightly reduced in diameter relative to the central portion 10. Such construction provides circumferential shoulders 12 between the central portion 10 and end portions 11 of reduced diameter.

Formed diametrically through the central body member 10 is an aperture 13 adapted to receive a metal bar or other element that functions as a wrench when assembling or disassembling the coupling.

Substantially cylindrical tubular nuts or bushings 14 are provided intermediate their ends with internal threads 15 that are adapted to engage external threads 16 that are formed on the outer end portions of the members 11. The outer ends of the tubular nuts or bushings are provided with axially disposed apertures 17 of such size as to receive the standard sizes of flexible rods R that are used in sewer and drain pipe cleaning apparatus.

Formed in the outer end portions of the end members 11 are short axially disposed openings 18 that register with the openings 17 in the ends of the tubular nuts or bushings 14 and, the inner portions of these openings 18 curve outwardly to the external faces of the end members 11 at points between the threads 15 and the shoulders 12.

These openings 18 are adapted to receive the curved ends C of the rods that are connected by the coupling and, to facilitate the assembly of the main body of the coupling member comprising the parts 10 and 11 with the curved ends of the rods, the outer ends of the openings 18 are notched as designated by 19, which notches extend inwardly from the ends of the members 11 on the same side of the openings 18 with the curved inner end portions thereof.

Formed in the peripheries of the end portions 11 adjacent the shoulders 12 are narrow grooves 20 and, seated therein are split rings 21, preferably of resilient metal, and which are somewhat similar to the conventional packing rings used in the pistons of internal combustion engines.

These rings 21 tend to expand and when the tubular nuts or bushings 14 are positioned on the end portions 11 of the central member of the coupling, the outer portions of said rings snap into internal grooves 22 that are formed in the nuts or bushings 14 adjacent their inner ends. As a result of this arrangement, the nuts or bushings are retained on the central member of the coupling until the parts are disassembled as a result of the use of wrenches or like tools and, such provision effectively prevents the tubular nuts from being unscrewed from the central member of the coupling as a result of frictional contact with the inner surfaces of the pipes or conduits in which the rods are inserted and while said rods are rotated during pipe cleaning operations.

Each nut or bushing 14 is provided with two or more flat faces such as 14a that are adapted to receive wrenches or the like utilized in unscrewing said nuts from the threaded end portions of the body member 10.

In the modified construction illustrated in Fig. 5, the threads 16 on the reduced end portions 11 of the body are eliminated and likewise the threads 15 within the nuts or bushings are eliminated, thus providing a construction wherein the nuts or bushings are applied to the portions 13 of the body with sliding movement. In this modified construction, the end portions 11 of the body member are provided with grooves 20a that receive split rings 21a and which latter are adapted to enter internal grooves 22a that are formed on the bushings, thereby latching the bushings on the body member with the ends of the rods R completely covered and protected by said bushings.

In the modified construction illustrated in Fig. 6, small tubes 25 are seated in the end portions 11 of the body, preferably at diametrically opposite points and, arranged in each tube is a ball 26 that is normally forced outward by a small expansive coil spring 27 located in the tube behind the ball. The outer ends of the tubes 25 terminate in inturned lips that prevent the balls from being forced entirely out of said tubes.

Balls 26 are adapted to enter an internal groove 28 that is formed in the bushing and thus the latter is latched in proper position upon the end of the body of the coupling.

One of the particularly advantageous features of my invention is, the construction wherein the open ends of the curved inner portions of the openings 18 are located on the external faces of the reduced end portions 11 of the body 10 inwardly with respect to the inner ends of the threads 16 and likewise inwardly from the inner ends of the threads 15 that are formed in the tubular nuts or bushings.

As a result of this construction, all of both pulling and compression strains impressed on the rods that are connected by the coupling are transmitted directly to the coupling body 10 and its end extensions 11 and none of said strains are transmitted to the tubular nuts or bushings.

I have demonstrated in practice that where pulling strains of the connected rods are impressed on the tubular nuts or bushings, the threads connecting the latter with the body of the coupling will after comparatively short periods of service be cut away and worn down to such a condition as to render the coupling unfit for service.

Thus it will be seen that I have provided a coupling particularly adapted for connecting the ends of rods and the like and which coupling is comparatively simple in structure, at the same time strong and durable and, said coupling being very effective in performing the functions for which it is intended.

Among the particular advantages of my improved coupling are, the construction of the bushings or tubular nuts which when applied to the body of the coupling entirely cover and protect the ends of the connected rods and further, the internal latching elements which effectually prevent the bushings or nuts from becoming detached from the body of the coupling as a result of frictional contact with the inner surfaces of the pipes or conduits that are being cleaned.

It will be understood that minor changes in the size, form and construction of the various parts of my improved rod coupling, may be made and substituted for those herein shown and described, without departing from the spirit of my invention, the scope of which is set forth in the appended claims.

I claim as my invention:

1. The combination with a pair of rods, the end portions of which are bent to form short curved hooks, of a coupling comprising a body provided in its ends with apertures for the reception of the curved ends of said rods, the inner ends of which apertures terminate on the peripheral surface of the coupling body on opposite sides of the latter, tubular members removably mounted on the ends of the coupling body and adapted when properly positioned thereon to overlie the ends of the curved portions of the rods, each tubular member being provided adjacent its inner end with an internally arranged annular groove and resilient means seated in the body of the coupling inwardly from the inner ends of the curved openings that receive the curved ends of said rods for engaging in said annular grooves to secure the tubular members in proper position upon the ends of said coupling body.

2. The combination with a pair of rods, the end portions of which are bent to form short curved hooks, of a coupling comprising a body provided in its ends with apertures for the reception of the curved ends of said rods, the inner ends of which apertures terminate on the peripheral surface of the coupling body on opposite sides of the latter, tubular members removably mounted on the ends of the coupling body and adapted when properly positioned thereon to overlie the ends of the curved portions of the rods, each tubular member being provided adjacent its inner end with an internally arranged annular groove and resilient split rings seated in grooves in the intermediate portion of said coupling body inwardly from the inner ends of the openings in the ends of the coupling body that receive the curved ends of said rods and adapted to occupy the annular grooves in said tubular members to retain same in position upon the ends of the coupling body.

3. The combination with a pair of rods, the end portions of which are bent to form short curved hooks, of a coupling comprising a body provided in its ends with apertures for the reception of the curved ends of said rods, the inner ends of which apertures terminate on the peripheral surface of the coupling body on opposite sides of the latter, tubular members screw seated on the ends of the coupling body and adapted when properly positioned thereon to overlie the ends of the curved portions of the rods, each tubular member being provided adjacent its inner end with an internally arranged annular groove, there being circumferential grooves formed in the intermediate portion of the coupling body inwardly from the inner ends of the apertures that receive the curved ends of said hooks and split resilient rings seated in said grooves for engaging in the annular grooves formed within the inner end portions of said tubular members when the latter are seated on the ends of the coupling body.

4. The combination with a coupling body provided in its ends with curved apertures, of rods having curved ends that are adapted to occupy the apertures in said coupling body, tubular members arranged for sliding movement on said rods for enclosing the ends of said coupling member and for covering the inner ends of said curved apertures and the ends of the curved portions of the rods that occupy said apertures and radially expansible resilient rings carried by the coupling member and adapted to engage said tubular members to retain the same in position on said coupling member.

5. A rod coupling comprising a body provided in its ends with curved apertures for the reception of the curved ends of rods with which the coupling is associated, the end portions of the coupling body being externally threaded, tubular members screw seated on the threaded end portions of the coupling body and adapted when positioned thereon to cover the ends of the curved apertures in the ends of said body and the ends of the rods that are seated in said curved apertures, said tubular members being provided adjacent their inner ends with internally arranged grooves, there being circumferential grooves formed in the coupling body inwardly from the inner ends of the curved apertures therein and split resilient rings seated in the grooves in the coupling body and adapted to engage the internal grooves in the tubular members to retain the latter in position on the coupling body.

WILLIAM D. OSBORN.